(12) United States Patent
Dabby et al.

(10) Patent No.: US 6,636,915 B1
(45) Date of Patent: Oct. 21, 2003

(54) CELL BUS DISTRIBUTED ARBITRATION SYSTEM AND METHOD

(75) Inventors: Amir Dabby, Holon (IL); David Michel, Kfar Sava (IL); Yaacov Levin, Nes Ziona (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/574,309

(22) Filed: May 19, 2000

(30) Foreign Application Priority Data

May 19, 1999 (IL) .................................................. 130039

(51) Int. Cl.$^7$ ................................................ G06F 13/14
(52) U.S. Cl. ........................ 710/240; 710/242; 710/119
(58) Field of Search .................. 710/240, 107, 710/100, 305, 2, 101, 242, 119; 725/119; 361/683, 686; 709/235, 208; 714/55; 370/419, 360, 400, 395.1, 395.6; 340/825.51

(56) References Cited

U.S. PATENT DOCUMENTS

| | | | |
|---|---|---|---|
| 5,430,848 A | * | 7/1995 | Waggener |
| 5,452,330 A | | 9/1995 | Goldstein |
| 5,689,406 A | * | 11/1997 | Wood et al. |
| 5,745,708 A | * | 4/1998 | Weppler et al. |
| 5,781,549 A | | 7/1998 | Dai |
| 5,822,300 A | | 10/1998 | Johnson et al. |
| 5,852,606 A | | 12/1998 | Prince et al. |
| 5,864,554 A | | 1/1999 | Rostoker et al. |
| 6,115,381 A | * | 9/2000 | Benenti et al. |
| 6,253,269 B1 | * | 6/2001 | Cranston et al. |

* cited by examiner

Primary Examiner—Gopal C. Ray
(74) Attorney, Agent, or Firm—Browdy and Neimark, P.L.L.C.

(57) ABSTRACT

A cell bus arbitration system comprises a data bus and a plurality of modules operative for sending data in data cell. The modules are connected to the data bus and each one of the modules is in communication with each one of the other modules via at least one control line such that each one of the modules is capable of receiving control signals generated by each other module. Arbitration logic assigns bus mastery to one of the modules.

17 Claims, 8 Drawing Sheets

CELL BUS DISTRIBUTED ARBITRATION SYSTEM AND METHOD

FIELD OF THE INVENTION

The present invention relates to a cell bus arbitration system and method and more particularly but not exclusively to a cell bus arbitration system and method for use in conjunction with an ATM switch.

BACKGROUND OF THE INVENTION

In a certain ATM switch layouts, the ATM switch requires external buffers to store data cells until the switch is prepared to handle these cells. These external storage buffers are controlled by cell buffer managers (CBM) which themselves are connected to a high speed data bus which is connected to the input of the ATM switch. A plurality of CBMs are used in order to ensure that there is a cell available at all times for the switch.

When the ATM switch requires a cell, one and only one of the CBMs is assigned mastery of the bus, allowing it to place one or more cells, from its external storage buffer, on the bus. The operation is high speed and it is necessary to ensure that a cell is placed promptly onto the bus when it is required, and that collisions on the bus between data from more than one CBM are avoided.

It is known to control the CBMs using a master controller. The master controller is able to provide an enable signal to each individual CBM and is operable to enable one CBM at a time. In order to ensure safe operation the master controller is generally duplicated and further control has to be provided to determine which master controller is active at any given time.

The above arrangement leads to relatively high system overhead in hardware terms, with two separate controllers operating a number of CBM's.

SUMMARY OF THE INVENTION

According to a first aspect of the present invention there is provided a cell bus arbitration system comprising a data bus and a plurality of modules operative for sending data in data cells, the modules being connectable to the data bus and each one of the plurality of modules being in communication with each one of the other modules via at least one control line such that each one of the plurality of modules is capable of receiving control signals generated by each one of the other modules, and wherein arbitration logic is operative to assign bus mastery to one of the plurality of modules. Preferably the data bus is connectable to the input of an ATM switch.

In a preferred embodiment each module is operative to exert a request for output when it has at least one cell to send, and bus mastery is assignable in turn to those modules asserting the request for output. Preferably, each module, upon being assigned bus mastery, is operative to relinquish bus mastery at the earlier of when it has no more cells to send and when a predetermined maximum time is reached. Again, preferably each module is operable to assert an output signal just prior to relinquishing mastery of the bus.

In an embodiment each module is adapted to determine from the arbitration logic which of the plurality of modules is to be assigned bus mastery.

A preferred embodiment comprises a deadlock prevention mechanism having a timer for each module set to a predetermined threshold time, and in which each module is set to assert bus mastery when the threshold time is reached without regard to the arbitration logic. Preferably a different threshold time is set for each module.

In an embodiment a predetermined threshold time, exceeding the maximum time required to give bus mastery to each module in turn, is set for each module and each module is operable to report an error state if the predetermined threshold time is reached whilst the module has data to send and bus mastery is not assigned to the module.

In accordance with an embodiment, the system is operable to detect whether bus mastery is being asserted by more than one module at any given time, and to place the more than one module asserting bus mastery into a waiting state.

In accordance with a second aspect of the present invention there is provided a cell buffer arbitration module for use with a cell buffer manager, the cell buffer manager module being connectable to a databus and being in communication with each one of a plurality of other modules via at least one control line such that at least one control signal from itself and from each other module is receivable at the module, and in which arbitration logic is operative to assign bus mastery to one of the plurality of cell buffer manager modules.

In accordance with a third aspect of the present invention there is provided a bus arbitration method for a plurality of modules for sending data cells via a data bus, the method comprising sending a first control signal from each module having a cell to send, to each one of the plurality of modules, and arbitrating bus mastery between the plurality of modules at each module such that each module sending the First control signal is given a turn successively at mastery of the data bus.

Preferably the data bus is connected to the input of an ATM switch.

In an embodiment each module upon being assigned bus mastery, relinquishes bus mastery at the earlier of when it has no more cells to send and when a predetermined maximum time is reached.

Preferably each module is operable to assert a second control signal upon relinquishing mastery of the bus.

In a further preferred embodiment of the present invention each module determines, using internal arbitration logic, and after receipt of the second control signal, which of the plurality of modules is to be assigned bus mastery.

A preferred embodiment further comprises deadlock prevention in which each module is assigned a predetermined threshold time, and each module is preferably set to assert bus mastery when the threshold time is reached without a reassignment of bus mastery. Preferably a different threshold time is assigned to each module.

In another embodiment a predetermined threshold time, exceeding the maximum time required to give bus mastery to each module in turn, is set for each module and each module reports an error state if the predetermined threshold time is reached whilst the module has data to send and bus mastery is not yet received by the module.

Another embodiment of the method further comprises the step of monitoring to determine whether bus mastery is being asserted by more than one module at any given time, and, if such a multiple bus mastery assertion is detected then it places all modules asserting bus mastery into a waiting state.

BRIEF DESCRIPTION OF THE DRAWINGS

For a better understanding of the invention and to show how the same may be carried into effect, reference will now be made, purely by way of example, to the accompanying drawings in which.

DESCRIPTION OF THE PREFERRED EMBODIMENTS

Figure 1:
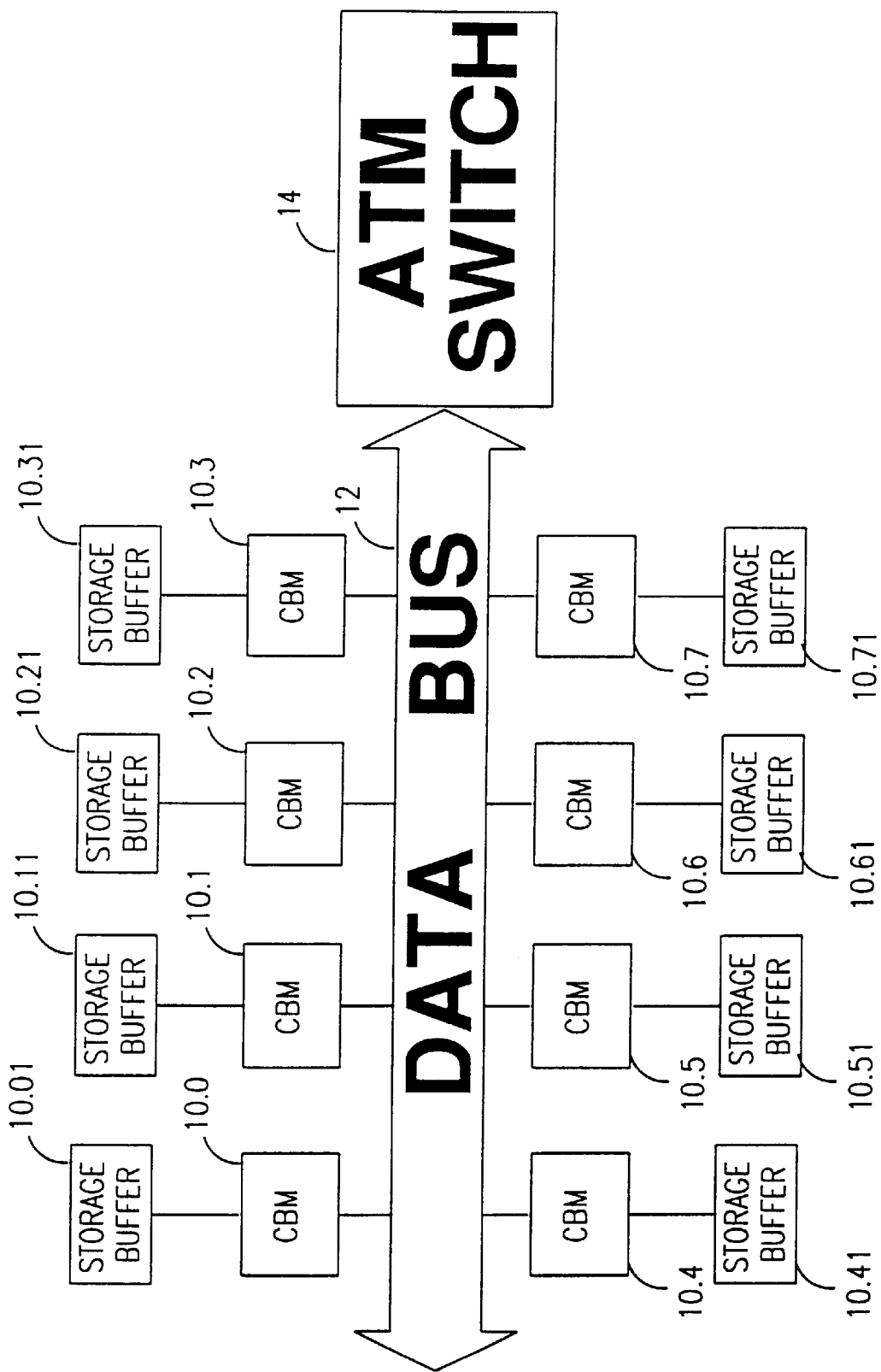
FIG. 1 is a simplified diagram of a first embodiment of the present invention showing a plurality of CBMs, their associated storage buffers, a data bus and an ATM switch.

FIG. 1 is a simplified schematic diagram of a first embodiment of the present invention in which a series of cell buffer managers (CBMs) 10.0–10.7 are connected to a data bus 12. Eight CBM's are depicted, however more or less can be used, with the major limiting factor being I/O pins, as will be explained. To each CBM is connected a respective storage buffer 10.01–10.71. The data bus 12 is in turn connected to an input of an ATM switch 14. Each CBM 10.0–10.7 receives data arranged in cells or packets and places the cells into its associated storage buffer 10.01–10.07. When an individual CBM is given control of the data bus, it takes cells from its respective storage buffer, and places one or more cells onto the data bus 12 for input to the ATM 14. The data bus 12 is generally only capable of transferring a single cell at a time from the CBMs 10.0–10.7. Each CBM takes it in turn, in the manner that will be described hereinbelow, to take over mastery of the data bus 12 and place cells thereon for transfer to the ATM 14. The data bus 12 is preferably a high speed data bus and this requires high speed control of the CBMs 10.0–10.7, such that cells be placed on the bus promptly when called for.

Figure 2:
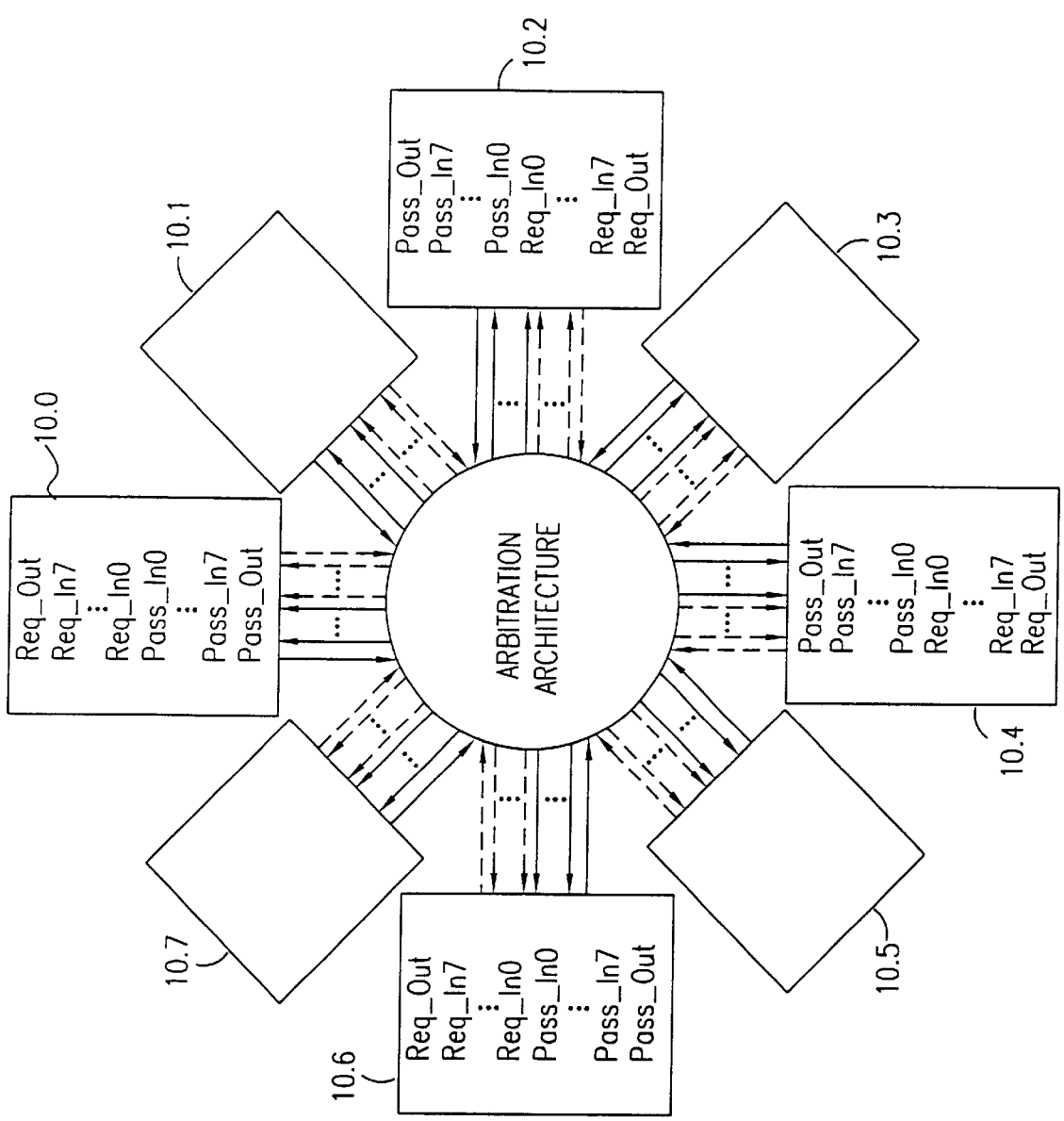
FIG. 2 is a simplified schematic diagram of the embodiment of FIG. 1, showing a ring arrangement of CBMs.

FIG. 2 is a simplified schematic diagram of the embodiment of FIG. 1, showing the series of CBMs, 10.0 . . . 10.7, arranged in a ring architecture. The ring arrangement relates to control interconnection of the CBMs 10.0 . . . 10.7 to allow them to send data cells onto the data bus 12.

Each CBM is preferably provided with arbitration logic and the ring arrangement ensures that each CBM 10.0 . . . 10.7 is provided with preferably identical control signals which will be described in detail below. As shown in FIG. 2 each CBM 10.0 . . . 10.7 issues two control signals, Req_Out and Pass_Out, and receives these same signals as inputs denoted as Pass_In and Req_In from each one the CBMs 10.0 . . . 10.7 including itself. Thus each CBM 10.0 . . . 10.7 receives identical inputs. The arrangement of inputs and outputs of the individual CBMs is described in more detail with respect to FIG. 8 below. In the following, a number between 0 and 7 appended to a signal name is used to indicate which of the CBMs 10.0–10.7 it is related to.

The Req_Out signal indicates that the individual CBM 10.0 . . . 10.7 has at least one cell to send and that it is functional.

The arbitration logic passes in turn around each of the CBMs 10.0 . . . 10.7 that is asserting Req_Out and gives it bus mastery. Once the CBM 10.0 . . . 10.7 has begun sending its last cell, whether because it has no cells left or because it has reached the maximum number of cells that it may send, as will be explained below, it asserts the Pass_Out signal to indicate that it is prepared to relinquish the bus, and thus it passes control of the bus on to the next CBM 10.0–10.7 in rotation that is asserting Req_Out.

The arbitration as to which CBM 10.0 . . . 10.7 has control of the bus at any given time is carried out at each individual CBM 10.0–10.7. As mentioned above, each CBM 10.0–10.7 receives the same control signals and, given the same control circuitry, each one is enabled to make the same decision, except as further explained below.

Each CBM has an identity (ID), preferably in the form of a number stored within the CBM. The IDs of the CBMs may be serially increasing numbers, thus automatically giving a turn order between the CBMs. In the normal operation of the arbitration mechanism, the Req_Out signals of the CBMs 10.0 . . . 10.7 are all examined, as well as the Pass_Out signals, and each CBM carries out a logical comparison as will be explained below, involving the source of the signals and its own ID. The individual CBM preferably becomes active when the Pass_Out signal from the active CBM is detected as a Pass_In signal, its own Req_Out is active and there are no other Req_Out signals (detected as Req_In signals) active from a CBM which is ahead of it in turn. To illustrate, a non limiting example with eight CBM's, having IDs from 0 to 7, is described below. In the example the currently active CBM has a Module_ID equal to 4. Each CBM operates in turn, from CBM 0 to CBM 7 and then back to CBM 0. CBM 4 takes control of the bus when a Pass_Out signal is generated (and detected as a Pass_In signal) if:

Req_Out4=1 i.e. CBM 4 has a cell to send AND

Pass_In3=1. i.e. the previous CBM in turn is now completing its turn or

Pass_In2=1 and Req_In3=0 i.e. the previous CBM (Module_ID equal 3) has no cells, and CBM module 2 is now completing its turn or Pass_In1=1 and Req_In2=0 and Req_In3=0 or Pass_In0=1 and Req_In1=0 and Req_In2=0 and Req_In3=0 or Pass_In7=1 and Req_In0=0 and Req_In1=0 and Req_In2=0 and Req_In3=0 or Pass_In6=1 and Req_In7=0 and Req_In0=0 and Req_In1=0 and Req_In2=0 and Req_In3=0 or Pass_In5=1 and Req_In6=0 and Req_In7=0 and Req_In0=0 and Req_In1=0 and Req_In2=0 and Req_In3=0 i.e. all other CBM's have no cells to transmit, and CBM4 does have cells to transmit.

Control of the bus is thus assigned to the CBM 10.0 . . . 10.7 corresponding to the next Req_Out in rotation that is detected. The arbitration mechanism then again awaits a Pass_Out signal from any CBM indicating that it is relinquishing bus mastery, and the arbitration proceeds to find the next CBM in turn that is exerting a Req_Out.

Figure 3:
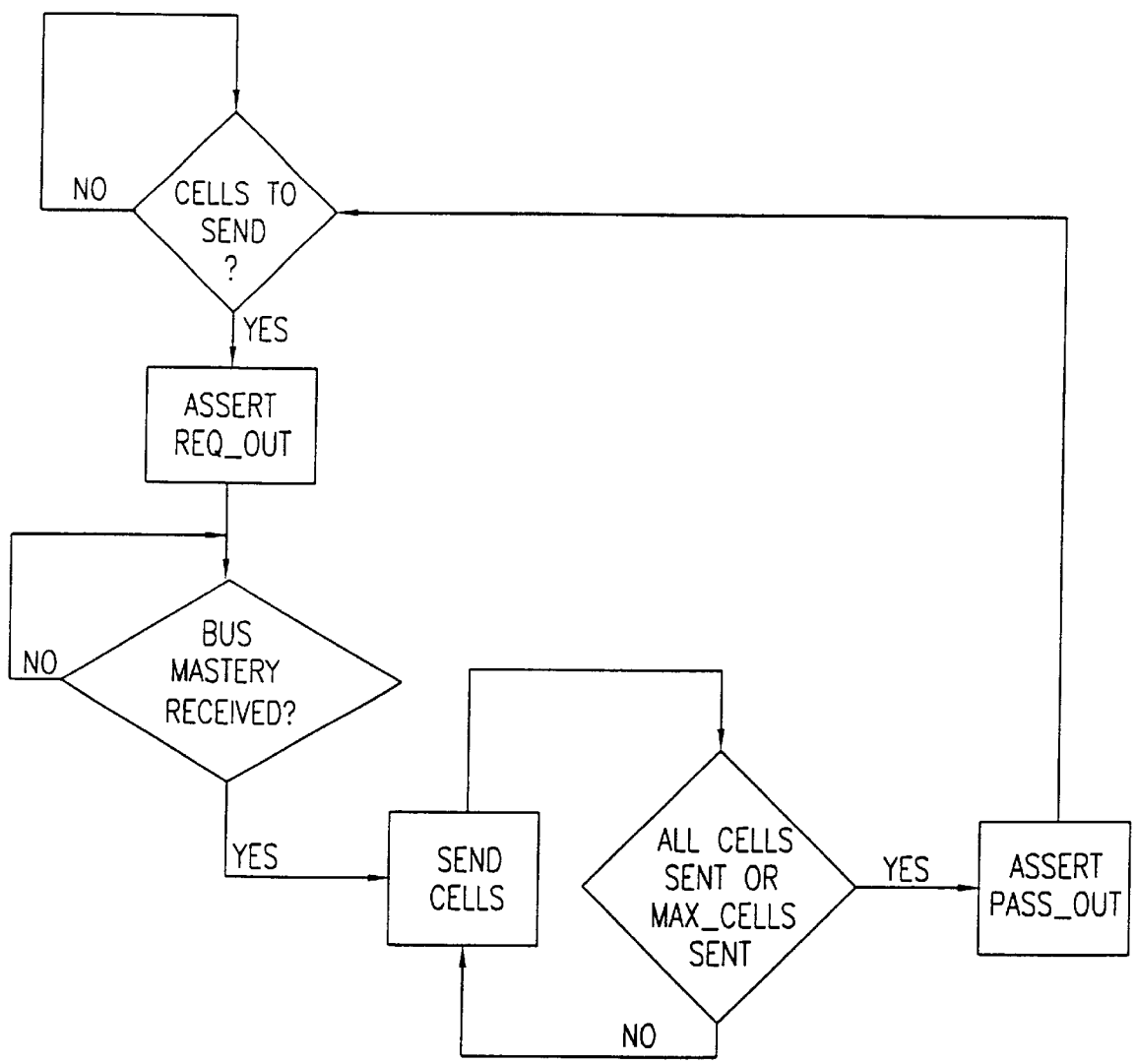
FIG. 3 is a simplified flow diagram showing normal operation of an individual CBM.

FIG. 3 is a simplified flow diagram showing normal operation of an individual CBM 10.0–10.7. In FIG. 3 each CBM carries out monitoring to determine whether it has a cell to send. If a cell is detected, the CBM asserts its Req_Out signal, and in due course receives mastery of the bus. It is to be understood by one skilled in the art, that if the ATM switch has invoked flow control, it has thereby restricted the cells to be transmitted to only those of a certain priority, and only those CBM's with cells that meet the flow criteria will assert their Req_Out signal. When a CBM receives mastery of the bus, it sends as many cells as it has available, keeping in mind any flow control restrictions, until it either exhausts its cells, or has sent a number of cells equal to Max_Cells of the CBM. The value of Max_Cells for each CBM may be set so as to control the bandwidth allocation being given to each CBM, and may be updated by the controlling software. The pre-set number Max_Cells thus serves to set a maximum amount of time that each CBM is permitted to hold the bus.

When the CBM is sending its last cell, either because there are no more cells to send or because it has reached Max_Cells, the Pass_Out signal is asserted. The arbitration mechanism of all the CBMs then passes control of the bus to the next CBM in rotation asserting a Req_Out and the present CBM returns to the first step, which is to monitor once again for cells to send.

The number Max_Cells may be set to different values for different CBMs 10.0–10.7. This is one of the ways possible in the present invention for allowing for different bandwidths at different ports.

Figure 4:
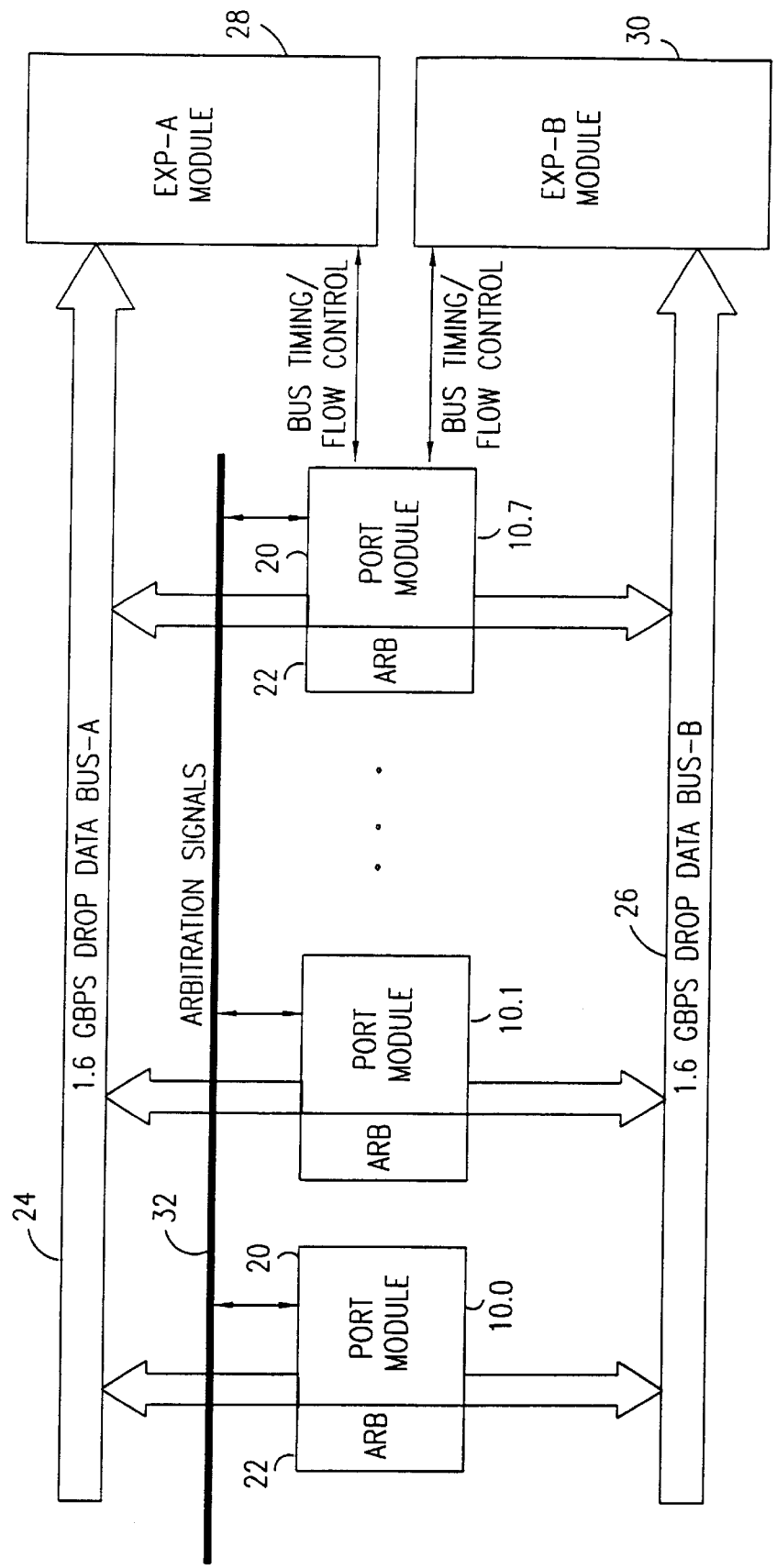
FIG. 4 is a simplified block diagram of a more detailed embodiment of the present invention.

Reference is now made to FIG. 4, which is a simplified block diagram of a more detailed embodiment of the present invention. In FIG. 4 each CBM 10.0 . . . 10.7 is shown to comprise a port module 20 and arbitration logic 22. The port module 20 comprises among other items, the standard cell storage buffer and serves to buffer incoming data for sending on to the ATM switch 14. The arbitration logic 22 is substantially identical for each CBM and, as mentioned above, serves to select which of the CBMs is active as the bus master at any given time.

Each CBM is attached to a first data bus 24. The first data bus 24 is, in the specific embodiment shown, a 1.6 GBPS drop data bus, which is a 16 bit wide bus. Each cell, including internal overhead is 64 bytes long and thus takes up 320 ns. In an alternative embodiment a 60 byte cell is provided, taking up 300 ns, and of course other cell lengths could also be used. The Pass_Out signal is held high for the duration of the final cell that the CBM is sending, 320 ns or 300 ns in the present example, and its rising edge informs the other CBMs that bus mastery should be passed on for the next cell.

The Req_Out signal is preferably not latched internally in the CBM until a predetermined number of clock cycles have passed, in order to avoid race conditions. Once the signal is latched it is then transferred to the CBM output and, at least one clock cycle later, it is read into all of the arbitrators 22.

Each CBM is also preferably connected to a second data bus 26. The second data bus 26 is preferably identical to the first data bus and is provided to back up the first data bus 24 in the event of failure. The first Data bus 24 is preferably connected to an expansion module 28 which forms part of the input of the ATM switch 14. Likewise the second data bus 26 is connected to a similar module 30.

Bus timing and flow control signaling is provided to each CBM in duplicate from the ATM switch by way of each of the expansion modules 28 and 30. In addition an arbitration connection 32 is provided between each of the CBMs 10.0 . . . 10.7. The arbitration connection takes the Req_Out and Pass_Out signals from each of the CBMs 10.0 . . . 10.7 and provides them as input to every CBM 10.0 . . . 10.7. as discussed above, in such a way as to provide the architecture of FIG. 2.

Control signals are provided to each CBM 10.0 . . . 10.7, and these indicate inter alia to the CBMs which of the two expansion modules 28 and 30 is currently operating correctly. If both of the modules are operating correctly then signals are obtained from both modules. Flow control indications are likewise obtained from both modules if active and operation is based on which of the two flow control signals is the most severe.

If a CBM is unable to send data due to flow control problems the CBM will not assert its Req_Out signal and it is thus prevented from taking control of the bus. Once flow control is released, or the CBM has cells that are permitted to be sent under the current flow control level, the CBM will again assert its Req-Out signal in a request to control the bus.

Figure 5:
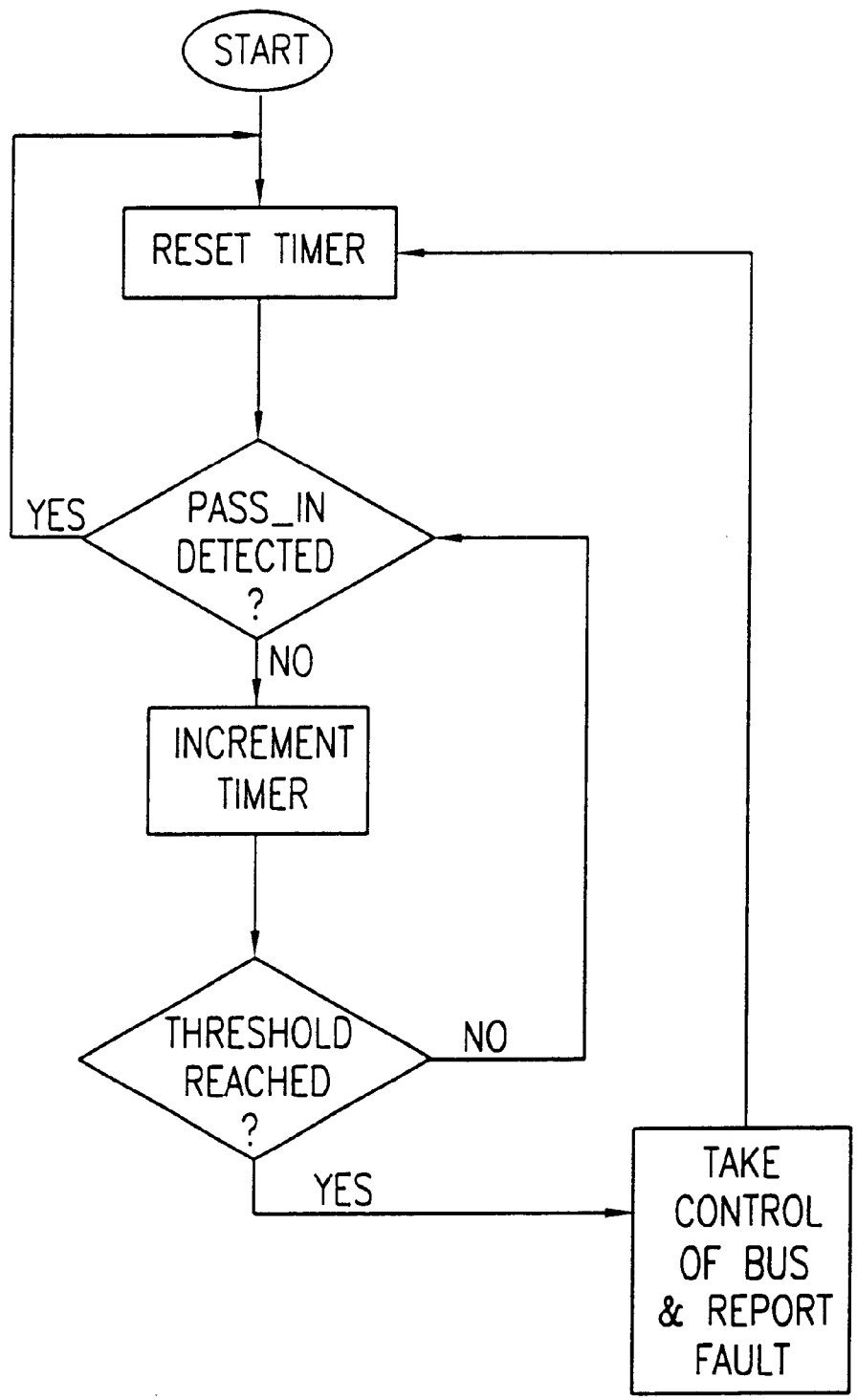
FIG. 5 is a simplified flow diagram of a first deadlock prevention mechanism for the embodiment of FIG. 4.

Reference is now made to FIG. 5 which is a simplified flow diagram showing a first deadlock detection mechanism for use in the embodiment of FIG. 4. Deadlock is any condition in which passing the mechanism does not pass correctly through any or all of its states in the proper order. In FIG. 5 there is shown the operation of deadlock detection in one of the CBMs, it being understood that the same mechanism is provided in all of the CBMs 10.0 . . . 10.7. The first deadlock detection mechanism preferably detects a form of deadlock in which control of the bus ceases to be passed from one CBM to the next. The passing of control is inferred by the assertion of one of the CBMs of its Pass_Out signal, which is detected by all the CBMs 10.0 . . . 10.7 as one of the Pass_In signals. A timer is reset each time a Pass_In signal is detected and is given a predetermined threshold time. The predetermined threshold time is chosen to be larger than the time required by the Max_Cells of any of the CBMs 10.0 . . . 10.7 and is different for each CBM. Once the threshold is reached, the timer will cause an interrupt to the CBM operating mechanism, and the CBM will take control of the bus and proceed as normal. If the CBM having the lowest threshold fails to take control of the bus for any reason then the next CBM in turn will be able to take control as soon as its higher threshold is reached. Preferably also, the fault is reported.

Figure 6:
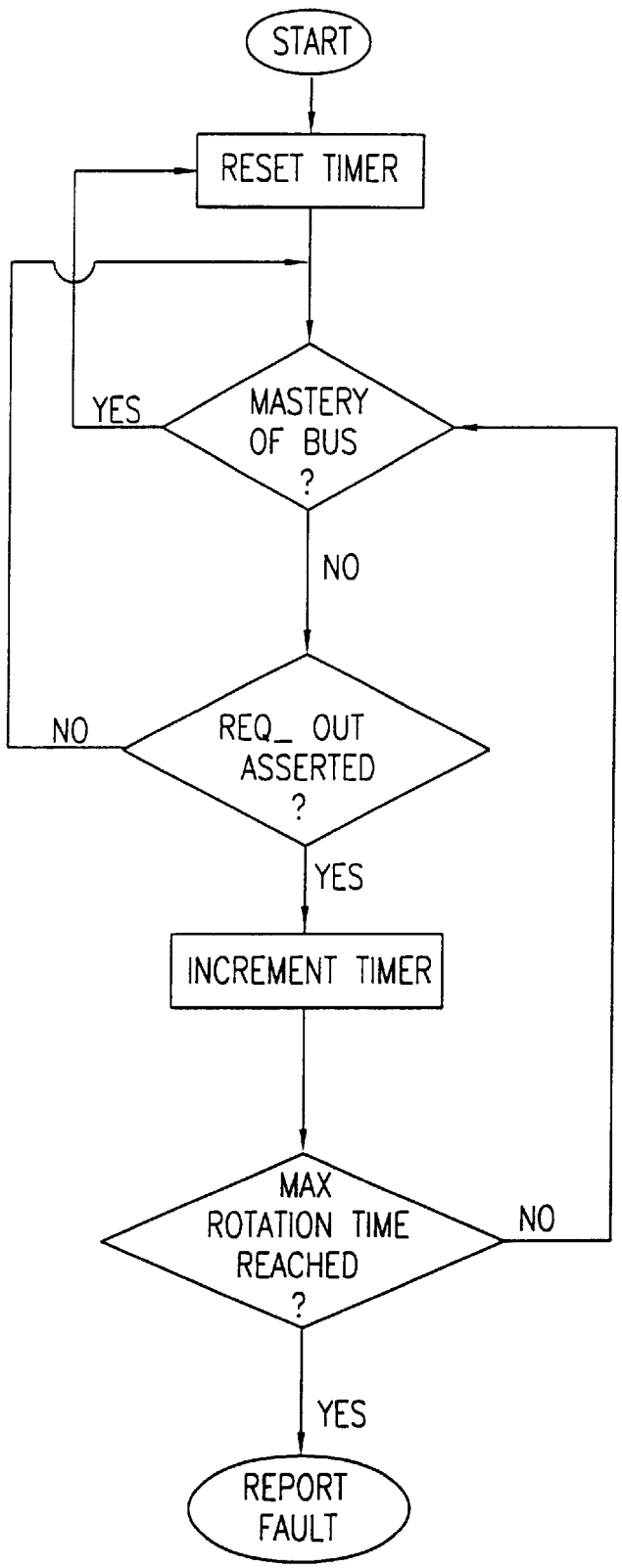
FIG. 6 is a simplified flow diagram of a starvation prevention mechanism for the embodiment of FIG. 5.

Reference is now made to FIG. 6 which shows a second deadlock detection mechanism, known as a starvation detection mechanism. Again the flow chart shows the operation of the starvation detection mechanism for a single CBM, however it is provided for each CBM 10.0 . . . 10.7. The starvation detection mechanism preferably detects a form of deadlock in which the individual CBM, whilst asserting its Req_Out, is not given bus mastery for a duration which exceeds the maximum rotation time, that is to say the amount of time it should take for all CBMs in turn to have bus mastery for their maximum transmission times. If the maximum rotation time is exceeded and the Req_Out has been asserted for this time, then a fault is reported to the controlling software, but no action is taken. As long as the Req_Out is not asserted the starvation detection timer is disabled. It is to be understood that the starvation timer may also be implemented as an interrupt to the CBM processor.

If more than one CBM succeeds in obtaining mastery of the bus at the same time then each CBM in control of the bus is forced into a wait state. The detection occurs when a CBM that is in an active state detects a Pass_In signal from another CBM, indicating that another CBM believes it is now relinquishing control of the bus. Upon detection, the CBM immediately moves to a wait state, and releases control of the bus, without activating its Pass_Out signal.

If the active CBM notes that none of the CBMs is asserting its Req_Out when it activates it Pass_Out signal this indicates that there is no data to be transferred. Thus control of the bus remains with the last CBM to be active, which enters a state referred to herein as an idle state and proceeds to send empty packets towards the switch, while maintaining its Pass_Out signal in active state. This state persists until another CBM raises its Req_Out signal, which is detected as a Req_In signal by the active CBM, which releases control of the bus in response thereto.

The arbitration system is enabled by an arbitration reference signal, which is preferably synchronized to a system clock and sent before the end of the cell period. Thus, prior to the end of the transmission of each cell, the arbitration mechanism receives a reference signal, and the arbitration functions are performed. Any CBM may be reset or disabled from the arbitration process by the controlling system software.

Figure 7:
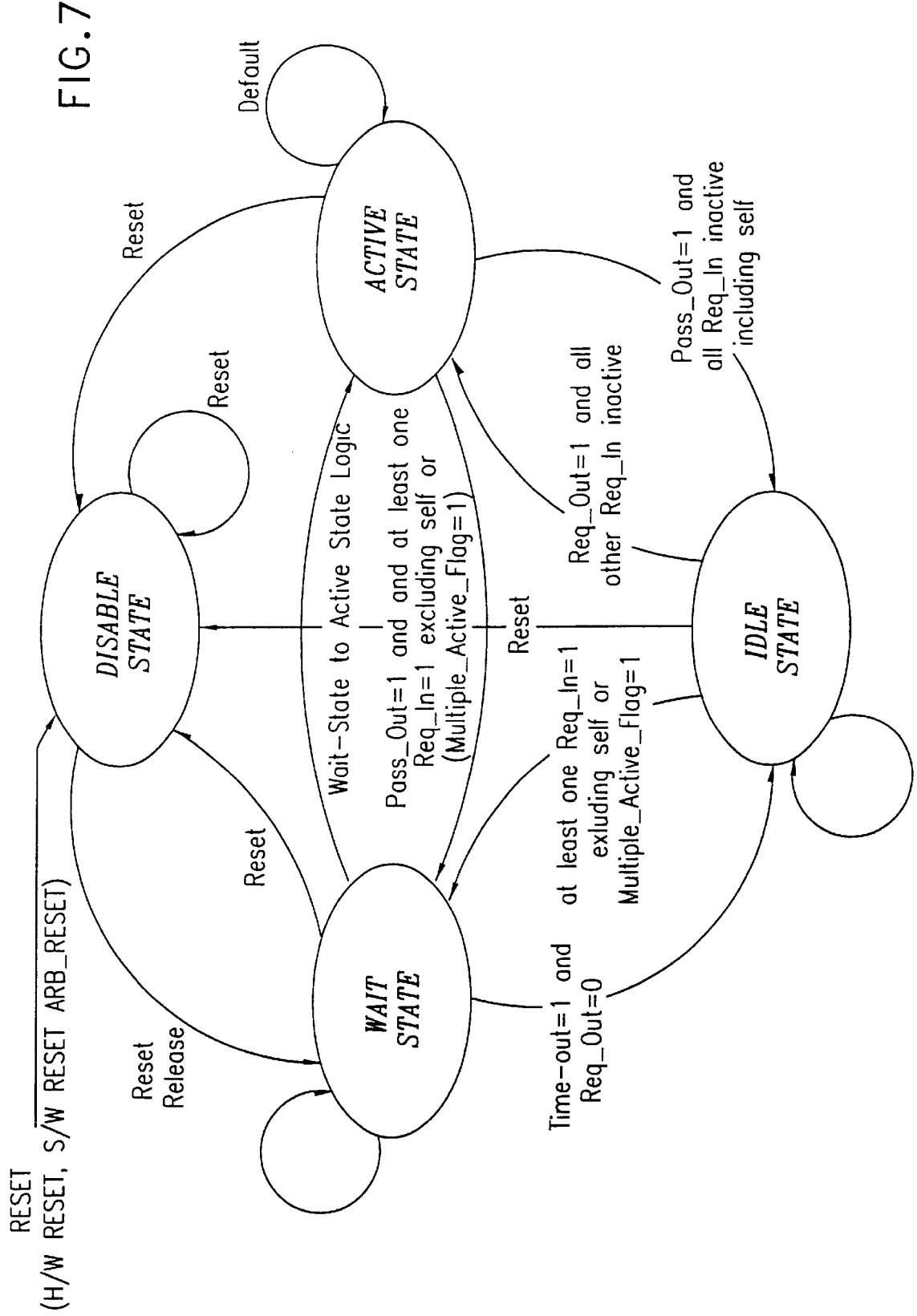
FIG. 7 is a simplified state diagram of the arbitration mechanism according to embodiments of the present invention.

Reference is now made to FIG. 7, which is a state diagram of the arbitration mechanism. In FIG. 7, four states of the CBM are shown, a disable state, a wait state, an idle state and an active state. The CBM generally moves between the wait state and the active state as described above. The CBM moves from the wait state to the active state when its Req_Out is asserted and no CBM with an active Req_Out is ahead of it in the rotation. The CBM returns from the active state to the wait state on assertion of its Pass_Out provided at least one Req_In is asserted. If no Req_In is asserted, including itself, the CBM moves to the Idle state, where it generates idle cells until at least one Req_In is asserted.

In the active state the CBM has control over the bus until all of its cells have been sent or until a predetermined maximum number of cells have been sent. In this state the CBM sends out valid cells and the bus mechanism is operative to detect multiple control of the bus. The various deadlock detection mechanisms are disabled in this CBM and the respective counters are preferably returned to their initial values.

The disable state is reached from all other states by means of a reset, and a reset release moves the CBM from the disable state into the wait state. The disable state is the initial state entered upon startup. The disable state disables any Req_Out and Pass_Out signals and loads all counters with their initialization values.

As discussed above, when more than one CBM asserts bus mastery, then each active CBM is placed into the wait state. This is achieved by assertion of a "Multiple Active" flag.

The idle state involves the CBM having mastery of the bus when it has no cells to send. In this state the CBM sends empty cells and it is pointed out that this state is reached only when none of the CBMs has data to send.

The idle state is reached from both the wait states and the active states. It is reached from the wait state following the operation of the first time out mechanism, if it is the CBM with the shortest timeout. As described above, each CBM has a timer which is loaded with an initial value when any Pass_In signal is detected. Each CBM has a different value, however all the values are greater than the largest amount of time that a CBM is allowed to hold the bus, i.e. the largest Max_Cells times the time per cell. The CBM with the lowest value will enter the idle state if no Pass_In signals are detected for the timeout period. The idle state may be reached from the active state when Pass_Out is 1 and all of the Req_In signals are set to zero. In the idle state the present CBM sends empty packets, as discussed above.

A CBM in an idle state reverts to the active state when it is asserting Req_Out and all other Req_In signals are zero. It reverts to the wait state if any other Req_In signals are asserted. In other words the idle state is abandoned by the CBM as soon as any CBM has cells to send. The CBM also reverts to the wait state if the "Multiple Active" flag is asserted, as discussed above.

It is noted that the CBMs move from state to state only when an arbitration reference signal Arb_Ref is asserted.

Figure 8:
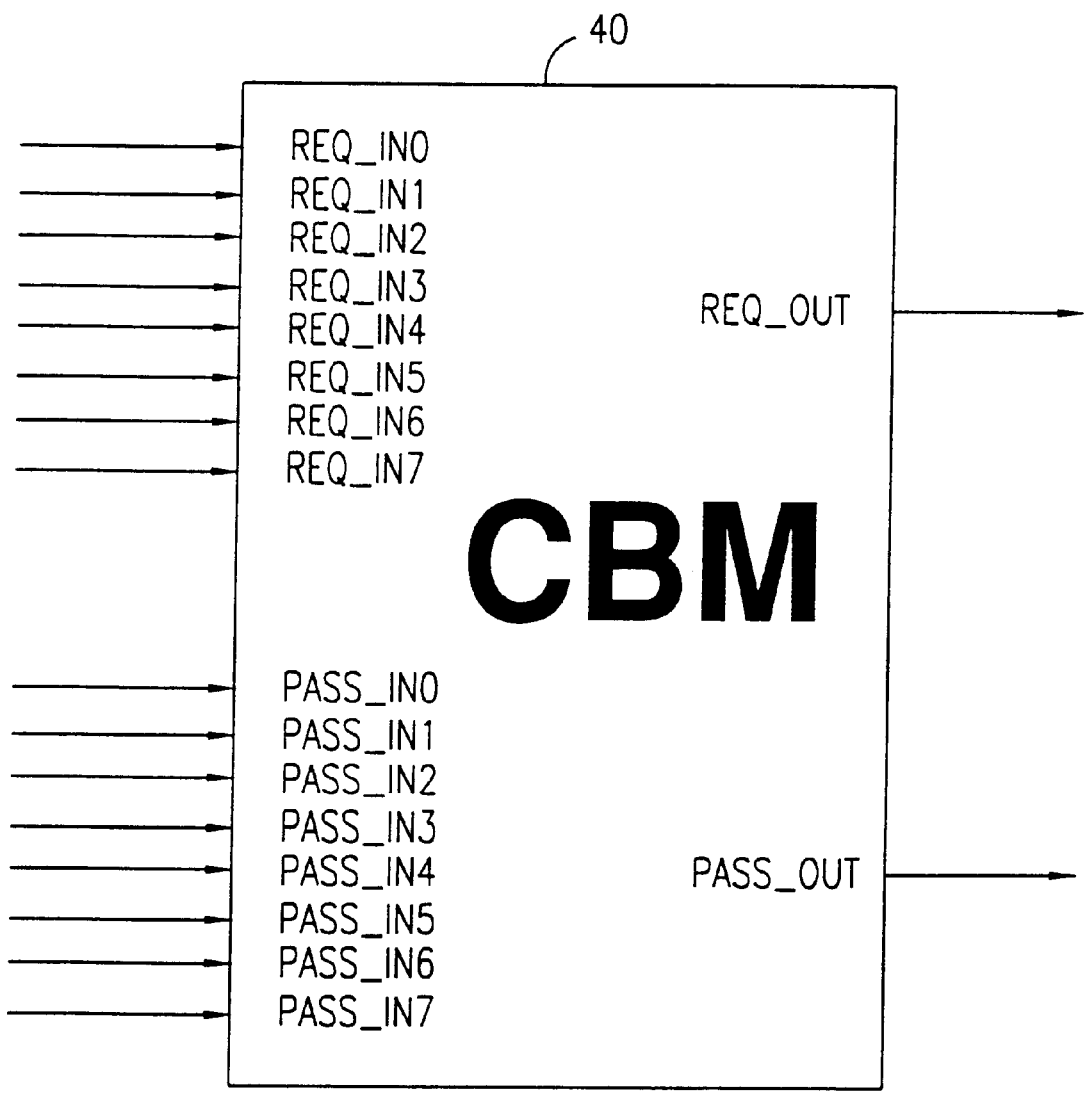
FIG. 8 is a simplified diagram of a CBM for use with embodiments of the present invention.

Reference is now made to FIG. 8, which shows a CBM 40 suitable for participating in the above-described arbitration mechanism. In addition to cell inputs and outputs, and other control signals as needed, which are not shown, the CBM 40 contains arbitration logic suitable for carrying out the arbitration described above and comprises at least two inputs for each CBM that may be connected to the system and two outputs. Shown is a CBM with connections for a total of 8 CBM's as shown in FIG. 1 and FIG. 2. The fourteen inputs shown are Req_In 0 . . . Req_In 7 and Pass_In 0 . . . Pass_In 7, and the two outputs shown are Req_Out and Pass_Out, as described above. The CBM 40 has sixteen additional inputs because it is designed to work as part of an arrangement of eight CBMs. The number eight is chosen for compatibility with existing systems and for simplicity, however, it is contemplated that in suitable circumstances, different numbers of CBMs will be used.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

In the claims that follow the term "module" includes CBM devices.

It will be appreciated by persons skilled in the art that the present invention is not limited to what has been particularly shown and described hereinabove. In particular the control lines could be replaced by a single serial control signal, or a control bus, or another method of communication as will be evident to one skilled in the art. Rather, the scope of the present invention is defined only by the claims that follow.

What is claimed is:

1. A cell bus arbitration system comprising a data bus and a plurality of modules operative for sending data in data cells, said modules being connectable to said data bus and each one of said plurality of modules being in communication with each one of the other modules via at least one control line, and wherein arbitration logic is operative to assign bus mastery to one of said plurality of modules, and
    wherein each module, upon being assigned bus mastery, is operative to relinquish bus mastery at the earlier of when it has no more cells to send and when a predetermined maximum time is reached.

2. A cell bus arbitration system according to claim 1, wherein each module is operable to assert an output signal just prior to relinquishing mastery of said bus.

3. A cell bus arbitration system comprising a data bus and a plurality of modules operative for sending data in data cells, said modules being connectable to said data bus and each one of said plurality of modules being in communication with each one of the other modules via at least one control line, and wherein arbitration logic is operative to assign bus mastery to one of said plurality of modules, and
    a deadlock prevention mechanism comprising a timer for each module set to a predetermined threshold time, and
    wherein each module is set to assert bus mastery when said threshold time is reached without regard to said arbitration logic.

4. A cell bus arbitration system according to claim 3, wherein a different threshold time is set for each module.

5. A cell bus arbitration system comprising a data bus and a plurality of modules operative for sending data in data cells, said modules being connectable to said data bus and each one of said plurality of modules being in communication with each one of the other modules via at least one control line, and wherein arbitration logic is operative to assign bus mastery to one of said plurality of modules, and wherein a predetermined threshold time, exceeding the maximum time required to give bus mastery to each module in turn, is set for each module and each module is operable to report an error state if said predetermined threshold time is reached whilst the module has data to send and bus mastery is not assigned to said module.

6. A cell bus arbitration system comprising a data bus and a plurality of modules operative for sending data in data cells, said modules being connectable to said data bus and each one of said plurality of modules being in communication with each one of the other modules via at least one control line such that each one of said plurality of modules is operative to receive control signals generated by each one of said other modules, and wherein arbitration logic means, distributed between the modules, is operative to assign bus mastery to one of said plurality of modules, wherein said cell bus arbitration system is operable to detect whether bus mastery is being asserted by more than one module at any given time, and to place all of said more than one module asserting bus mastery into a waiting state.

7. A cell buffer arbitration module for use with a cell buffer manager, said cell buffer manager being connectable to a data bus, and said module being in communication with each one of a plurality of other cell buffer arbitration modules via at least one control line such that at least one control signal from itself and from each other cell buffer arbitration module is receivable at said module, and wherein arbitration logic means distributed between all the cell buffer arbitration modules is operative to assign bus mastery to one of said cell buffer managers.

8. A cell bus arbitration method for a plurality of modules for sending data cells via a data bus, the method comprising sending a first control signal from each module having a cell to send, to each one of said plurality of modules, and arbitrating bus mastery between said plurality of modules at each module in a decentralized manner, such that each module sending said first control signal is given a turn successively at mastery of said data bus, wherein each module, upon being assigned bus mastery, relinquishes bus mastery at the earlier of when it has no more cells to send and when a predetermined maximum time is reached.

9. A cell bus arbitration method according to claim 8, wherein each module is operable to assert a second control signal upon relinquishing mastery of said bus.

10. A cell bus arbitration method according to claim 9, wherein each module determines, using internal arbitration logic means being part of the distributed arbitration logic means, and after receipt of said second control signal, which of said plurality of modules is to be assigned bus mastery.

11. A cell bus arbitration method according to claim 8, wherein each module is operable to assert a second control signal just before relinquishing mastery of said bus.

12. A cell bus arbitration method for a plurality of modules for sending data cells via a data bus, the method comprising sending a first control signal from each module having a cell to send, to each one of said plurality of modules, and arbitrating bus mastery between said plurality of modules at each module in a decentralized manner, such that each module sending said first control signal is given a turn successively at mastery of said data bus, further comprising deadlock prevention is which each module is assigned a predetermined threshold time, and wherein each module is set to assert bus mastery when said threshold time is reached without a reassignment of bus mastery.

13. A cell bus arbitration method according to claim 12, wherein a different threshold time is assigned to ach module.

14. A cell bus arbitration method for a plurality of modules for sending data cells via a data bus, the method comprising sending a first control signal from each module having a cell to send to each one of said plurality of modules, and arbitrating bus mastery between said plurality of modules at each module in a decentralized manner, such that each module sending said first control signal is given a turn successively at mastery of said data bus, wherein a predetermined threshold time, exceeding the maximum time required to give bus mastery to each module in turn, is set for each module and each module reports an error state if said predetermined threshold time is reached whilst the module has data to send and bus mastery is not yet received by said module.

15. A cell bus arbitration method for a plurality of modules for sending data cells via a data bus, the method comprising sending a first control signal from each module having a cell to send, to each one of said plurality of modules, and arbitrating bus mastery between said plurality of modules at each module in a decentralized manner, such that each module sending said first control signal is given a turn successively at mastery of said data bus, further comprising the steps of monitoring to determine whether bus mastery is being asserted by more than one module at any given time, and, if such bus mastery assertion is detected then placing all modules asserting bus mastery into a waiting state.

16. A cell bus arbitration system comprising a data bus and a plurality of modules operative for sending data in data cells, said modules being connectable to said data bus and each of said plurality of modules being in communication with each one of the other modules via a plurality of control lines such that each one of said plurality of modules is capable of collecting control signals of bus request and bus relinquish generated by each one of said other modules, and wherein arbitration logic means, distributed between the modules, is operative to assign bus mastery to one of said plurality of modules.

17. A cell buffer arbitration module for use with a cell buffer manager, said cell buffer manager being connectable to a data bus and controlled by the cell buffer arbitration module; said module adapted to be in communication with each one of a plurality of other cell buffer arbitration modules via a plurality of control lines such that control signals of bus request and bus relinquish from itself and from each other cell buffer arbitration module is receivable at said module, and wherein arbitration logic means distributed between all the cell buffer arbitration modules is operative to assign bus mastery to one of said cell buffer managers.

* * * * *